United States Patent
Zillikens et al.

(12)

(10) Patent No.: US 6,813,503 B1
(45) Date of Patent: Nov. 2, 2004

(54) WIRELESS COMMUNICATION TERMINAL FOR ACCESSING LOCATION INFORMATION FROM A SERVER

(75) Inventors: Frank Zillikens, Essen (DE); Stefan Hoyler, Bochum (DE)

(73) Assignee: Nokia Corporation, Espoo (FI)

( * ) Notice: Subject to any disclaimer, the term of this patent is extended or adjusted under 35 U.S.C. 154(b) by 141 days.

(21) Appl. No.: 10/069,667

(22) PCT Filed: Aug. 31, 2000

(86) PCT No.: PCT/EP00/08521

§ 371 (c)(1),
(2), (4) Date: Jun. 3, 2002

(87) PCT Pub. No.: WO01/19102

PCT Pub. Date: Mar. 15, 2001

(30) Foreign Application Priority Data

Sep. 2, 1999 (GB) .............................. 9920681
Nov. 19, 1999 (GB) .............................. 9927354

(51) Int. Cl.[7] .............................................. H04Q 7/20
(52) U.S. Cl. ................. 455/457; 455/456.1; 455/456.3; 455/456.4; 455/456.5
(58) Field of Search .............................. 455/457, 456.1, 455/456.3, 456.4, 456.5

(56) References Cited

U.S. PATENT DOCUMENTS

| | | | | |
|---|---|---|---|---|
| 5,673,322 A | | 9/1997 | Pepe et al. ..................... | 380/49 |
| 6,108,779 A | * | 8/2000 | Dean et al. ..................... | 713/2 |
| RE38,267 E | * | 10/2003 | Borkowski et al. ...... | 455/456.1 |

FOREIGN PATENT DOCUMENTS

| | | | | |
|---|---|---|---|---|
| WO | 98/59506 | | 12/1998 | ............ H04Q/7/22 |
| WO | 99/27742 | | 6/1999 | ............ H04Q/7/38 |
| WO | WO 01/13069 | * | 2/2001 | ........... G10C/21/36 |

OTHER PUBLICATIONS

Fujino, et al., "Mobile Information Service Based on Multi-Agent Architecture", IEICE Transactions on Communications, JP, Institute of Electronics Information and comm. Eng. Tokyo, vol. E80–B, No. 10, Oct. 1, 1997, pp. 1401–1406.

* cited by examiner

*Primary Examiner*—Nick Corsaro
*Assistant Examiner*—Alan T. Gantt
(74) *Attorney, Agent, or Firm*—Antonelli, Terry, Stout & Kraus, LLP

(57) ABSTRACT

A system, a method, and a wireless communication terminal for accessing location information from at least one server. The terminal comprising a receiver and a transmitter arranged to receive and transmit data packets from/to at least one server comprising location means, through a wireless communication network connected to linking means. The linking means is arranged to forward the data packets between the terminal and the server. A memory is also provided in the terminal, which comprises at least one item, which is provided with an access point which indicates the site of the server to be accessed, wherein the server is accessed by sending a request through the wireless communication network as a data packet comprising the access point to the linking means to access and receive content from the server. A browser application is arranged in the terminal, to establish a session to the linking means.

34 Claims, 6 Drawing Sheets

WIRELESS COMMUNICATION TERMINAL FOR ACCESSING LOCATION INFORMATION FROM A SERVER

BACKGROUND OF THE INVENTION

1. Field of the Invention

The invention relates to a method, terminal and system for providing location information from a server to a wireless communication terminal.

2. Description of the Prior Art

There are many ways of determine positions, for example the position of a car can be determined by means of so called car navigation systems. These kind of navigation systems may comprise a satellite receiver connected to processing means and a mobile phone. The satellite receiver, e.g. a global position system (GPS) receiver, is able to receive signals giving an indication of the position of the receiver, i.e. in this case the car. The received signals can then be processed by the processing means, and sent by the mobile phone as a request to a server. The server can be provided with a location database comprising e.g. digitized maps, and is able to respond to the request. The respond can then be processed by the processing means, and can for example be shown as a digitized map on a display. In this way it will be possible to obtain location information, which is dependent on the position of the car.

One example on a navigation system is known from WO96/11381, which describes a navigation device for people. The device comprises a navigation unit which has a receiver device for the wireless transmission of data for detecting the current geographical position. It is possible to provide an input, $unit_1$ in particular for the input of a target position. The result of this input is presented by an output unit, in particular for the output of path guiding data. To process all the data, the device further comprises a computer, in particular for route planning. The computer comprises a memory with a digitized road map and can be connected for data transmission to the navigation unit via a communication unit. The navigation unit, the communication unit, the input unit and the output unit form a portable hardware unit. The communication unit comprising a transmitter-receiver for the wireless transmission of route data between the computer and the portable unit.

Another example of a navigation system is disclosed in WO 96/07110, which describes a navigation information system comprising a communications system having a fixed part and a mobile part. The fixed part includes a data storage and processing means for identifying the location of a mobile unit, generating guidance information appropriate to that location and transmitting it to the mobile unit. The user makes a request for guidance information, and the system, having determined the user's present location, then transmits instructions to the user. The user's present location can be determined by means such as a Satellite Positioning System.

An alternative way of measuring the position in a navigation system by satellite receivers, is shown in for example EP-A2-0753978, which describes a process for directing a subscriber toward a destination within an SDMA (Space Division Multiple Access) mobile radio network, and a processor controlled station control. The station control contains a communications interface unit for receiving a message that specifies a destination desired by a subscriber, and a microprocessor which determines the current location of the subscriber by evaluating directional and distance information. The station control furthermore contains a communications interface unit, whereby it retrieves information from a data base, which defines a route from the location to the destination. This information is transmitted in summary form to the subscriber's mobile radio terminal.

However, all of the navigation systems mentioned above, are dependent on the location of the user. This means that the user who requests a service from a service provider, e.g. a request of traffic information, should include its present position. This is a major drawback, since this in some cases requires additional equipment, which can be rather expensive. Furthermore, the user has to convert the positioning information into a prescribed format, and send the positioning information to the server together with the service request. This way makes difficult cooperation with different service providers which can demand different types of formats.

Also, even the user uses a cellular position process as disclosed in EP-A2-0753978, this requires that the user disclose an actual position to the service provider. This means that the user must reveal the user's position, which is a major security hazard, if the user is are not sure about the trustworthiness of the service provider. For example, when the request is processed at the server, a hacker could more easily find out that where the user is, or even worse include a virus in the response back to the terminal. Also sending the actual position of the user, occupies a lot of space in the traffic on the wireless network, since data transmissions on a wireless network normally have a very narrow bandwidth.

Furthermore, in WO99/27742 a telecommunication system is disclosed, which uses a terminal based browser within a mobile phone to connect the phone to web-based location services and to a Mobile Positioning Center (MPC). The browser is able to present graphical information, which permits the user of the mobile phone to determine the present location of the mobile phone. The browser is also able to communicate with a location services node, through a cellular network. To obtain the present location of the phone, the browser first sends a positioning request and format information associated with the positioning request to the location services node. Thereafter, the MFC receives the request from the location services node, and determines the phones coordinate location. The information about the location of the phone is then forwarded back to the phone and presented on the browser. However, as disclosed in EP-A2-0753978, this requires that the user must disclose the user's actual position to the service provider, which means that the user must reveal the user's position, which is a major security hazard.

Therefore, there is a significant need for a wireless communication terminal to receive location information from a server more efficiently, which has a increased level of security. Also, it would be advantageous to avoid transmission of unnecessary position information. Yet another need is to have one single format for position information, which is independent of the format required by the service provider, in order to facilitate the use of different positioning tools.

SUMMARY OF THE INVENTION

In accordance with an aspect of the present invention, there is provided a wireless communication terminal for accessing location information from a server. The terminal comprises a receiver and a transmitter arranged to receive and transmit data packets from/to at least one server comprising location means, through a wireless communication network connected to linking means. The linking means is arranged to forward the data packets between the terminal and the server. A memory is also provided in the terminal, which comprises at least one item, which is provided with an access point which indicates the site of the server to be accessed, wherein the server is accessed by sending a request through the wireless communication network as a data packet comprising the access point to the linking means to access and receive content from the server. A browser application is arranged in the terminal, to establish a session to the linking means by reading the item from the memory, enable the transmitter to send the request as a data packet through the linking means to the server, and handle received content by means of the receiver. A user interface is connected to the browser application having display means for displaying content received from the server and user input means provides an input to the browser application. The input comprises a query of location information, which is independent of the position of the terminal, wherein the input is provided in the request, and arranged to receive content comprising an indication of the location information from said server by means of the location means.

Hence, the invention provides a request from a wireless communication terminal, like a cellular phone, for accessing location information from a server comprising location information, which is independent of the position of the terminal. This means that the terminal sends a request to the server for receiving an indication of location information, without revealing the position of the terminal upon sending the request to the server. As an example, the present invention can be implemented in a Wireless Application Protocol Architecture (WAP) environment. The Wireless Application Protocol (WAP) is a result of continuous work to define an industry wide standard for developing applications over cellular communication networks. This makes it possible to access for example the Internet or other kinds of information networks provided with hypermedia servers, from an ordinary cellular phone supporting WAP. These types of cellular phones which support WAP, have only a small fraction of the resources of a typical desktop or portable computer. This means that the features in the phone are very limited compared to a computer. The reason for this limitation is the size of the phones, i.e. the phone has a severe limitation in processing power, memory space, display size and buttons or keys by which a user can request, view and manipulate information obtained from a hypermedia server. Therefore, it is very important that the features in the phone are made as efficient as possible. Also, the relatively high cost for a call from a cellular phone makes it also very important to provide the client with a fast response from the server.

A particular advantageous embodiment, is that the terminal can also be provided with position means, to determine position information of the terminal, and optionally send the positioning information to the server, either when requested from the server or in the request sent to the server, in order to give an indication of the position of the terminal. Thus, it is the user who controls the information sent between the terminal and the server, since it is optional. Also, this will provide a high degree of freedom for the user, to choose between different alternatives, by making a choice if any position information should be sent to the server.

Further advantages according to the present invention will be apparent from the dependent claims.

BRIEF DESCRIPTION OF THE DRAWINGS

The invention will be described in greater detail in the following by way of example only and with reference to the attached drawings, in which FIG. 1 schematically illustrates a preferred embodiment of a hand portable phone according to the present invention, FIG. 2 schematically shows the essential parts of a telephone for communicating with a cellular or cordless network, FIG. 3 schematically shows a connection between a communication terminal and different servers in a network, according to a preferred embodiment according to the present invention.

DETAILED DESCRIPTION OF THE INVENTION

Figure 1:
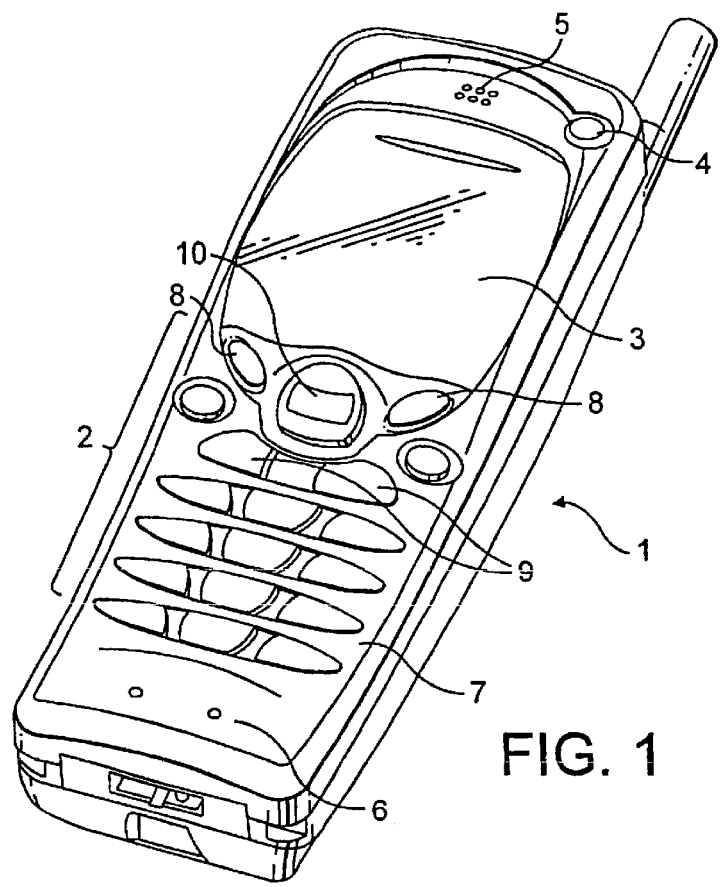

FIG. 1 shows a preferred embodiment of a wireless communication terminal, hereafter also referred to as a phone, according to the present invention. The phone, which is generally designated by 1, comprises a user interface having a keypad 2, a display 3, an on/off button 4, a speaker 5, and a microphone 6. The phone 1 according to the preferred embodiment is adapted for communication via a wireless telecommunication network, e.g. a wireless network. However, the phone could also have been designed for a cordless network. The keypad 2 has a first group 7 of keys as alphanumeric keys, by means of which the user can enter a telephone number, write a text message (SMS), write a name (associated with the phone number), etc. Each of the twelve alphanumeric keys 7 is provided with a figure "0–9" or a sign "#" or "*", respectively. In alpha mode each key is associated with a number of letters and special signs used in text editing. The keypad 2 additionally comprises two soft keys 8, two call handling keys 9, and a navigation key 10.

The two soft keys 8 have a functionality corresponding to what is known from the phones Nokia 2110™, Nokia 8110™ and Nokia 3810™. The functionality of the soft key depends on the state of the phone and the navigation in the menu by using a navigation key. The present functionality of the soft keys 8 is shown in separate fields in the display 3 just above the keys 8.

The two call handling keys 9 are used for establishing a call or a conference call, terminating a call or rejecting an incoming call.

The navigation key 10 is an up/down key and is placed centrally on the front surface of the phone between the display 3 and the group of alphanumeric keys 7. Hereby the user will be able to control this key by simply pressing the up/down key using his/her thumb, i.e. it allows the user to scroll between a group of items in e.g. a menu provided in the user interface. Since many experienced phone users are used to one-hand control, it is a very good solution to place an input key, requiring precise motor movements. Thus, the user may place the phone in the hand between the finger tips and the palm of the hand. Hereby, the thumb is free for inputting information. In another embodiment, the scroll key can be a roller key (not shown), which is arranged to rotate in one or several directions. The roller allows the user to roll the key to scroll between different items in a menu. In case of a roller key, the soft key 8 could be arranged to the roller. i.e. upon pressing on the roller the same functionality, as the operation key has, could be entered. The roller key has a functionality corresponding to what is known from e.g. the phone Nokia 7110™, which also supports the Wireless Application Protocol (WAP). The roller key is incorporated by reference in U.S. patent application Ser. No. 08/923,696.

Figure 2:
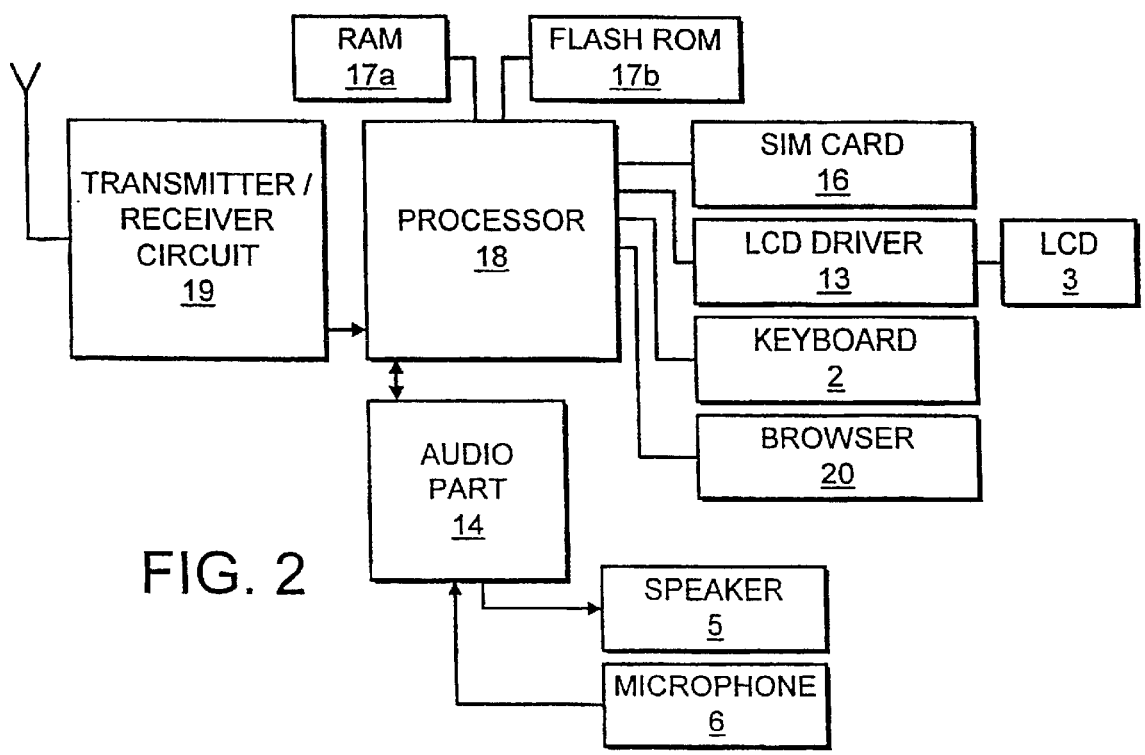

FIG. 2 schematically shows the most essential parts of a preferred embodiment of the phone. These parts being essential to understand the invention. The preferred embodiment of the phone of the invention is adapted for use in connection with a GSM network, but, of course, the invention may also be applied in connection with other phone networks, such as other kinds of wireless networks and various forms of cordless phone systems or in dual band phones accessing sets of these systems/networks. The microphone 6 records the user's speech, and the analog signals formed thereby are A/D converted in an A/D converter (not shown) before the speech is encoded in an audio part 14. The encoded speech signal is transferred to control means 18. The control means 18 comprises a processor, which may support software in the phone. The control means 18 also forms the interface to the peripheral units of the apparatus, wherein the peripheral units can comprise a RAM memory 17a and a Flash ROM memory 17b, a SIM card 16, the display 3, a browser application 20, and the keypad 2 (as well as data, power supply, etc.). The browser application 20 can be used to request and receive content from a server, which is described in more detail hereinafter, with reference to FIG. 3–5. The control means 18 communicates with a transmitter/receiver means 19, e.g. a circuit which is adapted to send/receive a request/respond to/from a telecommunication network. The audio part 14 speech-decodes the signal, which is transferred from the control means 18 to the earpiece 5 via a D/A converter (not shown).

The control means 18 is connected to the user interface. Thus, it is the control means 18 which monitors the activity in the phone and controls the display 3 in response thereto. Therefore, it is the control means 18 which detects the occurrence of a state change event and changes the state of the phone and thus the display text. A state change event may be caused by the user when he activates the keypad including the navigation key 10, and these type of events are called entry events or user events. However, the network communicating with the phone may also cause a state change event. This type of event and other events beyond the user's control are called non user events. Non user events comprise status change during call set-up, change in battery voltage, change in antenna conditions, message on reception of SMS, etc. Accessing Location Information from A Server to A Wireless Communication terminal.

Figure 3:
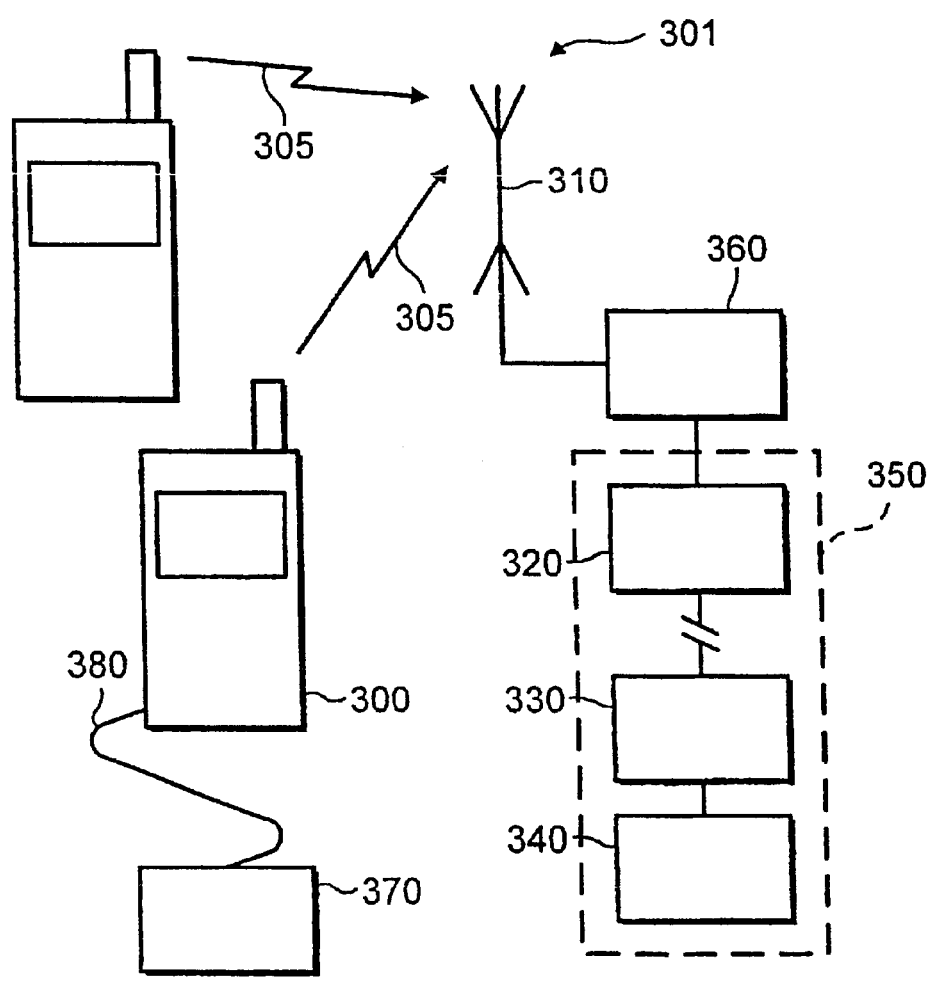

FIG. 3 schematically shows a system 301, for accessing location information from a server. The system comprises a wireless communication terminal 300, a wireless network 310, and a plurality of web servers 320, 330 and 340 in an Internet network 350. The (Internet network 350 uses World Wide Web (WWW) protocols, and is provided with location means. The location means is arranged to receive/transmit data packets from/to the terminal. For example, the location means could be a database comprising digitized maps, and/or text information describing the location. The database can be updated continuously, in order to send updated location information to the terminal. The wireless network 310 is arranged to establish a wireless connection 305 between a plurality of. wireless terminals 300 and linking means 360. Even if the linking means is usually connected to a server to be accessed, it is possible that the linking means may be integrated together with the server to be accessed, as well.

The terminals 300 are able to access at least one of the web servers 320–340 provided with location means, via the linking means 360. The terminals 300 could typically be a cellular phone. In general, the linking means 360 is arranged to enable a session for the wireless communication terminal 300 and to transmit data packets between the terminal and one of the web servers 320–340. Thus, the web servers 320–340 are arranged to receive and/or transmit data packets from/to the terminal 300. The transfer of data packets is often mentioned as pull and/or push. A pull could be described as the terminal using an access point to access a site where e.g. the location information is stored, and might also determine whether it has been updated and to retrieve it if necessary. In some cases it could also be possible to use a push, which could be described as the opposite to pull, i.e. the server maintains address data necessary to transfer updated location information to the terminal.

The linking means 360 in this example is typically a gateway or a proxy, but is hereafter referred to as gateway. A proxy server is a process that allows the user to fetch different types of documents, like WWW, FTP, and GOPHER documents. The proxy server can store the documents in a cache memory in the radio terminal. What this means is that when anyone retrieves a document, besides transferring these files to the radio terminal, a copy can also be made on the local host. Thus, the next time the user accesses that document, a request is sent to the remote host to see if the page has been updated, and if not, it is read directly from the cache memory. A gateway can be a computer that lies at the intersection of a server to be accessed and a client, and routes traffic from one or several servers to the client. Thus, the function of the gateway is to provide a link between two disparate types of electronic communications such as WAP architecture and Internet architecture. Communication between a wireless terminal 300 and the gateway 360 is according to the Wireless Application Protocol (WAP).

WAP defines a set of standard protocols that enable communication between wireless communication terminals, like cellular phones and network servers. Other types of communication terminals could be pagers and personal digital assistants. WAP uses a standard naming model according to which standard Internet URLs are used to identify content on different web servers. It also uses content typing. All WAP content is given a specific type consistent with WWW typing which allows a wireless terminal to correctly process the content based on type. WAP also uses standard content formats and standard communication protocols. Thus, WAP brings Internet content and advanced data services to wireless terminals. WAP can work across differing wireless network technologies and bearer types (TDMA, COMA, SMS). Communication between the web servers 320–340 and the gateway 360 is according to WWW protocols.

In this embodiment, the gateway 360 translates, i.e. formats, requests for location information from a WAP protocol stack used by the wireless terminal 300 to a WWW (World Wide Web) protocol stack used by the web server. The web server leaves a response with an indication of the location information, which can for example return WAP content such as WML (Wireless Markup Language), WMLScript, XML (Extensive Markup Language) and/or WWW content such as HTML (HyperText Markup Language). In the later case a filter is used to translate, i.e. format, the WWW content to WAP content e.g. HTML to WML, WMLScript or XML. In a preferred embodiment, the gateway is able to encode content sent over the wireless network to the wireless terminal and decode data sent to it by the wireless terminal. This means that the system, i.e. the terminal, the linking means and the server, can be provided with encoding/decoding means, which can enable a fast transmission of data packets between the server and the terminal. Hence, this enables a transfer of binary data packets, which is much easier (faster) to transfer than an uncoded data packet. One way of handling data packets in a binary format is to use so called WAP Binary Content Format, such as WBXML (Wireless Binary extended Markup Language).

In another preferred embodiment, the terminal can be provided with security means (not shown), which is able to demand a confirmation of the request sent to the server. The security means can be provided in the browser application, and can be either default or an optional feature, i.e. the user is able to or not able to interact. Hence, when the security means is activate, the user should confirm a desire to send the request to the server. The major reason for having security means, is that the user in some cases reveals user position, which can be hazardous in some cases. For example, if a user is not sure about the trustworthiness of the service provider. This means that when the request is processed at the server, a hacker could more easily find out that where the position of the user, or even worse include a virus in the response back to the terminal. Also, if the terminal is connected to position means, e.g. a navigation system for a vehicle, this could directly reveal the position of the user. Hence, the security means is able to provide the user with some privacy, and not revealing any information to third parties without the user's permission.

Also, the system can also encrypt/decrypt data packets between the terminal and the server, in order to provide a high level of security when transmitting wireless information. The data packets comprising the request, the formatted request, the response and the formatted request. This means that the gateway can be provided with encoders and decoders (not shown). Also, the server may comprise different algorithms to make the encryption/decryption. The encryption/decryption itself may be performed by well-known methods, e.g. RSA, Diffie-Hellman, etc. Regardless of the way how the position is gathered in the WAP Client, i.e. the terminal, the user of a location dependent service must be able to decide to whom she/he gives her/his position information. Additionally the user wants to make sure that her/his position is only available to a specified origin server and not to other parties. The decision of the user to whom she/he wants to give the position information can be realized in many different ways. For example, 1. The user is prompted every time a WMLScript function, is processed.
2. Managing a list of URLs, which point to trusted servers. The URL of the calling WMLScript could be checked against this list. This URL is known to the terminal by comparing the requested URL with a list of trusted servers. If the URL is reliable, the WMLScript function is executed. In the case of failure an invalid string can be returned.
3. The client, i.e. the terminal, could request to encrypt, every time the output of the script library with the mechanism defined in a crypto library. The crypto library provides a possibility to sign data of a client, and is able to encrypt user data before sending it.
4. A Server certificate can be used, which only identifies the linking means. If the WMLScript was requested from a origin server, which is riot the linking means, the linking means has to take care of the privacy.

Applying the second option to this preferred embodiment means, that the client should check the URL of the calling WMLScript, before the script function is executed. Only if the WMLScript was requested or pushed from a trusted server, which is listed in a special position trusted server list, the script is processed. This list can be managed by the user. Also, the crypto library could be a so called WMLScript Crypto Library which will offer the possibility to sign data of a client with a digital signature before transmitting these to the origin server. Additionally this library provides the possibility to encrypt the user data, before sending it.

A Wireless Application Environment which forms an upper layer of the WAP stack includes a browser application, also called a microbrowser. Typically, the encoding/decoding means is provided in the browser application of the terminal. The browser can use WML and a lightweight markup language, WMLScript a lightweight scripting language. WML implements a card and deck metaphor. The interaction of the browser and user is described in a set of cards which are grouped together into a document commonly referred to as a deck. The user navigates to a card in a deck reviews its content and then navigates to another card in the same deck or in a different deck. The user is also able to enter requested information, makes choices, and move on to another card. Decks of cards are transferred from origin servers as needed. Cards are grouped together into decks. Thus, the content which the user receives mostly from a server comprises cards and decks. A WML deck is similar to a HyperText Markup Language (HTML) page, in that it is identified by a URL, and is the unit of content transmission. WML includes text and image support, including a variety of formatting and lay-out commands. WML includes support of explicitly managing the navigation between cards and decks. WML also supports anchored links, similar to those in HTML.

The wireless communication terminal differs from a desktop or a portable computer with Internet facilities in that generally it has a less powerful CPU, less memory, restricted power consumption, smaller displays and more limited input devices. The wireless network differs from the Internet network in that it generally has less bandwidth, more latency, less connection stability and less predictable availability. The WAP architecture is optimised for narrow bandwidth bearers with potentially high latency and is optimised for efficient use of device resources.

Upon communicating with the wireless network 310, in order to receive, access and transmit data packets from e.g. the web server 320 through the gateway 360, the wireless communication terminal 300 comprises a receiver and a transmitter, see also FIG. 2 ref. no. I 9. The terminal 300 further comprises a memory, see FIG. 2 ref. no. I 6 (SIM card) and I 7b (ROM), provided with an identifier and at least one item. The item is provided with an access point which indicates the location of the server to be accessed, which could be indicated by means of a URL (Uniform Resource Locator) address. In addition, the item can also comprise data packets from earlier sessions which is updated upon a new session to the same access point. The identifier is used to identify content at the address provided by the server, wherein the server is accessed by sending the identifier to the linking means to identify which type of content is requested at the server. In addition, the content is associated with link content, which is provided at different locations in the server 320 or in another server 330, 340.

Also, the item can comprise a script, which is arranged to provide provisions for accessing servers through linking means. The script can activate or download linking applications from a gateway, i.e. an application which makes it possible to receive and/or transmit different types of data packets between the server and the terminal. For example, the different types of data packets can be a particular text format, software programs, picture formats. This can be done by creating extensions to WML and WML script. Thus, the script can make it possible to access data packets, which might not be supported by the software in the terminal, by downloading the appropriate application, supporting the type of data format, directly to the terminal. In general, the data packets, can be data (content) stored or generated at an origin server 320. The content of the data packet is typically displayed or interpreted by the client. This allows a standard WAP browser to be used and provides flexibility for new features, e.g. a service provider having location information supported by different formats dependent on the request. This can be done by creating extensions to WML-, WML-script and XML-documents. Thus, the script can make it possible to access data packets, which might not be supported by the software in the terminal, by downloading the appropriate application, supporting the type of data format, directly to the terminal. In general, the data packets, is data (content) stored or generated at an origin server. The content of the data packet is to be displayed or interpreted by the client. For example, one service provider supports a data packet comprising position information given by means of a satellite receiver, another server could support position information provided by cell identity information, and a third does not require any positioning information.

Instead of displaying the received content on a display provided on the phone, it is also possible to present the content by means of a speaker, which can be built in the phone or externally connected to the phone.

As mentioned before, the Wireless Application Environment forms an upper layer of the WAP stack, and includes a browser application. To access different servers the terminal is provided with a browser application, like the so called microbrowser. The browser application is arranged to establish a session to at least a gateway by reading the item in the memory. Also, the browser application can also be provided with pull means to fetch the content comprising location information from the server 320, at the site indicated by the access point.

Figure 5A:
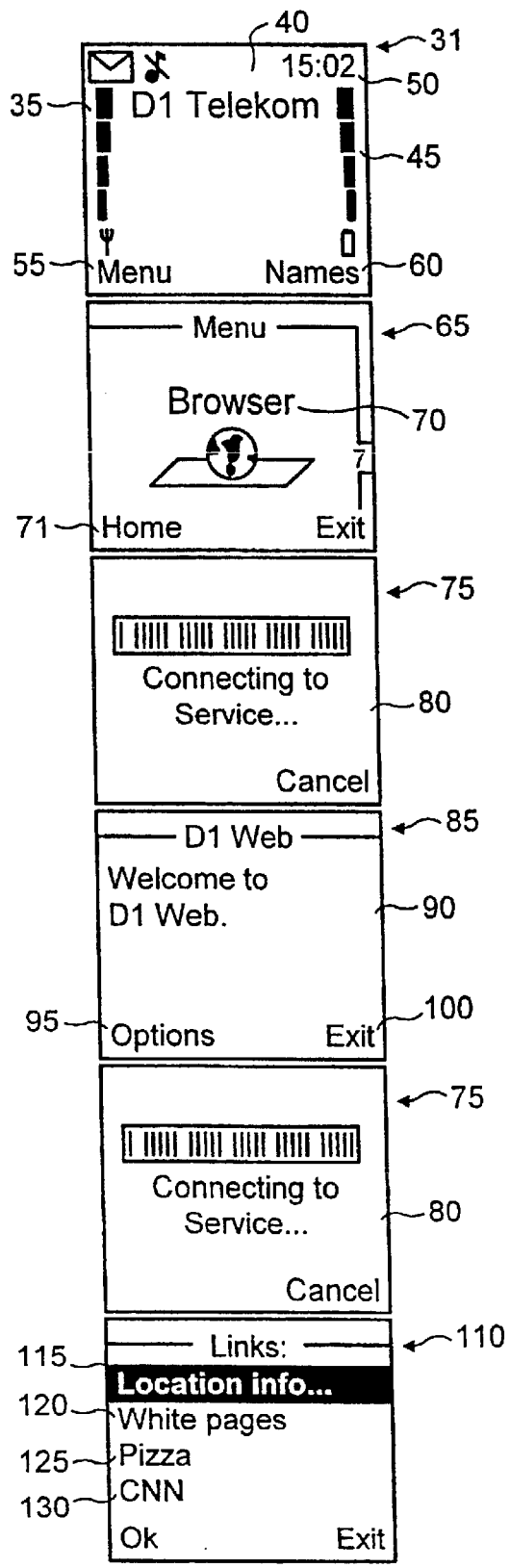
FIGS. 5a–b shows an example of a user interface in a phone according to the present invention.
Figure 5B:
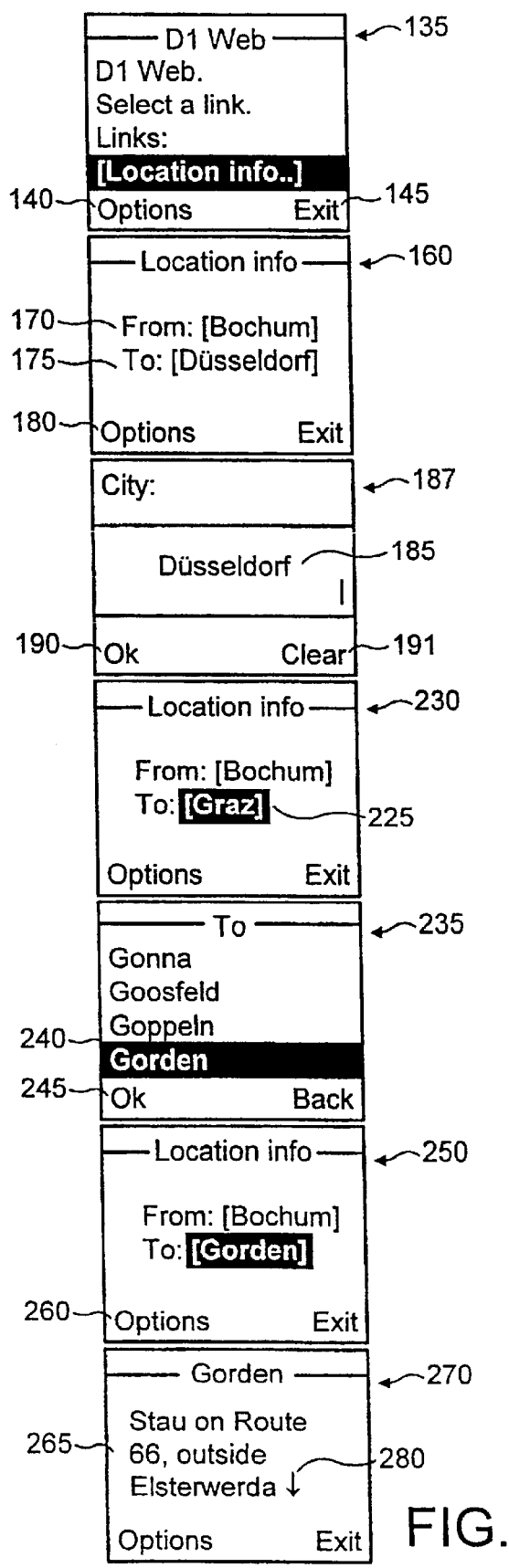

In accordance with the present invention, the terminal 300 comprising a user interface (as shown in FIG. 1 reference no. 2, 3, 4, 5, and 6), which is connected to the browser application. The user interface has a display for displaying content received from a server and user input means to control the browser, by providing an input to the browser application. The input means could for example be a keypad or voice recognition means) to provide an input to the browser application. An example of how the user interface can be displayed during a session is shown in FIGS. 5*a*–*b*. The input means is shown in FIG. 1 as the keypad 2. The browser can be arranged in a ROM memory 17*b* or on a SIM card 16, as shown in FIG. 2. Hence, the input can be made if the user presses a key on the keypad of the terminal, and activate a request to a server 320–340. This request is arranged to be sent through the transmitter as a data packet. The input comprises a query identifying location information, and is associated with at least one access point, indicating the site of the server 320 to be accessed. The terminal is able to send this request without sending any information about its position to the server, i.e. the request is independent of the position of the terminal 300. This means that the terminal 300 is able to send a request to the server for receiving an indication of location information, without revealing the position of the terminal upon sending the request to the server. The input is provided in the request, together with the access point, and arranged to receive content comprising an indication of the requested Location information from the server. To receive content with location information, the server 320–340 is provided with location means, which may comprise digitized maps and/or text information over different locations. In this embodiment, the location means can be a deck, comprising cards with requested location information, of a language supporting WAP, like WML, WMLscript, or XML. It is also possible to have it in another format, and format the indication of the location information into a suitable format at the linking means.

In a preferred embodiment, the terminal could be connected to position means 370, provided with connecting means 380 to be inputted to the terminal. The position means could be a global positioning system (GPS) receiver, or by using cell identity information. The connecting means 380 can comprise a wired link or a wireless link (like an infrared link or a low power RF link (e.g. Bluetooth)). If it comprises a wired Link, it can also comprise a cable provided with electrical plugs, to physically connect the position means to the terminal. If the connecting means is a wireless link, it is suitable to provide the terminal with an appropriate protocol, to control the position means. Naturally, the wired link should also be provided an appropriate protocol, to control the position means. The position means 370 could provide greater flexibility to the user. For example, one who would like to use a GPS receiver will be independent of the wireless network, or may choose a less expensive solution to provide position information. Another example of position means is one who would like to use the wireless communication network, could obtain position information by receiving cell identity information, by using time difference information, and/or using time of arrival information. Thus, it is possible to provide an input unit, in particular for the input of a target position. The result of this input can also be presented by an output unit in the positioning means, in particular for the output of path guiding data. To process the all data, the position means further comprises a computer, in particular for route planning. The computer could comprise a memory with a digitized road map and can be connected for data transmission to the server via a communication unit. Hence, it is possible to present the content received from the server on the positioning means, e.g. by a display and/or a speaker connected to the positioning means.

Accordingly, as a response to the request, the server can send a position request, as an indication of the requested location information. This position request can be a WML-Script, which is then processed by the browsing application. The position response from the terminal can then either be a rejection of the position request, or it can send a position response back to the server indicating the position of the terminal. The position response can be provided by the positioning means, as mentioned above. After gathering the information to the position response, this information can be encoded to the binary representation of e.g. art XML-document. The output of this content encoding process, the binary representation of the XML-document, is then returned in the position response of the WMLScript request. This string is designed for the transmission to the linking means, which can be decoded at the linking means, and can be sent to the server as an XML document. Finally, the position response to the server is then able to fetch the content of the requested location information. This can be made by sending the requested Location information through the linking means, back to the terminal. The presentation of the requested location information can be presented either directly to the user of the terminal, or it presented to the terminal itself. If the presentation is made on the terminal itself, it means that the terminal is able to update information itself. For example, when the user is driving and focusing on the driving, it is not always very convenient to request for updated information manually. Therefore, this feature automatically provides the user with updated location information without requiring any user interaction.

In a preferred embodiment of the present invention, where it is required by the server to have the actual position of the terminal, this embodiment provides different ways of obtaining position information, if the terminal is not able to provide position information itself. If the terminal is not able to obtain position information, the terminal is able to send a content type or a header to the linking means, to provide the server with the requested position information. The header fields allow the terminal to pass additional information about the position request, and about the terminal itself, to the linking means. These fields act as request modifiers, with semantics equivalent to the parameters on a programming language method (procedure) invocation. In this embodiment, it is preferred to use the content type. This content type or header might contain an indication that the terminal is not able to provide this position information, and it could be possible for the user of the terminal to set an option to search for alternative ways of obtaining the position information of the terminal. This searching could e.g. be done by means of the linking means, or even by the server itself. If it is the linking means, which performs the search to find the location of the terminal, this information can be sent from the linking means to the server, e.g. as an XML-document, i.e. the linking means is able to generate an XML-document comprising the position information. The position information can be obtained from the cell identity information, which is provided by the wireless telecommunication network, by using time difference information, and/or using time of arrival information. If it is the server, which performs the search to find the location of the terminal, this information will then be handled by server and generates the requested location information, based on the obtained position information. The position information could also be obtained in the same manner as in the case of the linking means, i.e. by means of the cell identity information, which is provided by the wireless telecommunication network.

Figure 4:
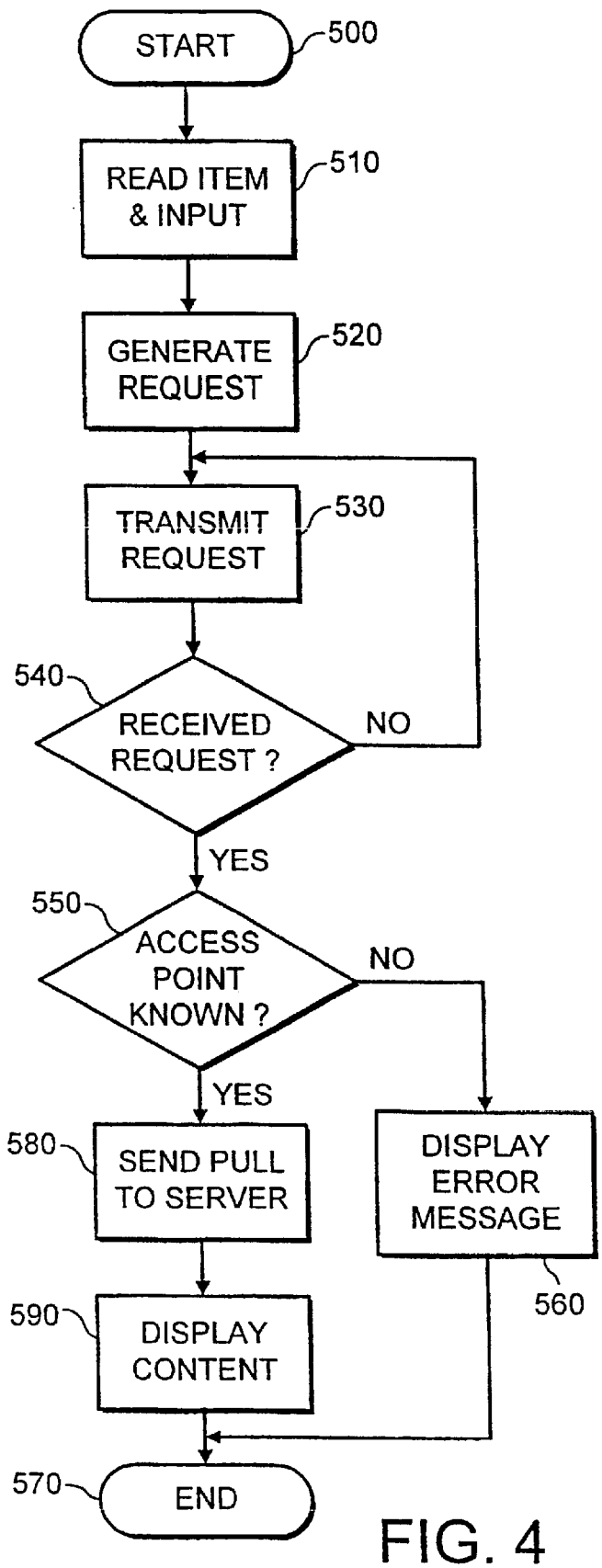
FIG. 4 shows a flowchart over a method for receiving location information from a server to a cellular telecommunication terminal, according to the present invention.

A Method for Providing Location Information from a Server to a Wireless Communication Terminal FIG. 4 shows a flow chart, in accordance with the present invention, describing a way of providing location information from a server through a wireless communication terminal. The wireless telecommunication terminal in this example is the same type as described in FIGS. 1 and 2, and the apparatus is hereafter also referred to as a phone. The phone is provided with a browser application and a memory which enables the user to browse among different objects on a server. This browsing can be done by using a browser application supporting WAP. When the phone is activated and establishes, a wireless connection to a wireless network, e.g. when the phone roams to a new network, "START" 500, it is possible to communicate with different telecommunication services, e.g. WAP related services, i.e. a service which can be accessed from a server to the phone. By using this kind of service, it might be possible to obtain information from a server to the phone, e.g. by using SMS (Short Message Service), or a similar service.

First, the user may select a browser menu on a display controlled by the browser application, which is connected to the memory. In this browser menu the user can choose to establish a session to a server comprising location means, e.g. in form of digitized maps and/or text giving indications of requested location information. In this embodiment, the location means can be a deck, comprising cards with requested location information, of a language supporting WAP, like WML, WMLscript, or XML. It is also possible to have it in another format, and format the indication of the location information into a suitable format at the linking means. To establish the session the user selects the service connected to the server from the menu. The selection is done by e.g. pressing on one of the softkeys as shown in FIG. 1.

In accordance with the present invention, the selection also comprise an input of location information inputted by means of e.g. the softkeys, which is independent of the position of the terminal. Then the browser application reads and identifies the content of an item from the memory, and the query identifying requested location information "READ ITEM" 510. This item comprises at Least one access point, which indicates the location of the server to be accessed. The item might comprise more content than the access point, e.g. it is possible to have data packets received from an earlier session which is updated upon a new session to the same access point. The memory can also be provided with an identifier, which is used to identify a content at the server. After reading the item from the memory, the browser application generates a request, "GENERATE REQUEST" 520, in order to receive an indication of the requested location information from the server, at the location indicated by the access point. This request comprises information of the access point to be accessed, the query of location information and the identifier identifying the content at the server. The information could for example be a URL address, where the server is located. The request is then sent through the transmitter as a data packet.

In a preferred embodiment, the terminal can be provided with security means (not shown), which is able to demand a confirmation of the request sent to the server. The security means can be provided in the browser application, and can be either default or an optional feature, i.e. the user is able to or not able to interact. Hence, the security means is able to provide the user with some privacy, and not revealing any information to third parties without the user's permission, i.e. when the security means is activated, the user should confirm that the user would like to send the request to the server. This confirmation could for example occur if the server requires the actual position of the terminal. Then the response from the server could be a request for position information from the terminal, which the user can choose to accept and send the required position information from the server. The major reason for having security means, is that the user in some cases reveals his position, which can be hazardous in some cases. For example, if the user is not sure about the trustworthiness of the service provider. This means that when the request is processed at the server, a hacker could more easily find out the position of the user, or even worse include a virus in the response back to the terminal. Also, if the terminal is connected to the position means, as mentioned above, this could directly reveal the position of the user. To avoid this, the WAP client, i.e. the terminal, should check the access point when calling a WMLScript, before the script function is executed. Only if the WMLScript was requested or pushed from a trusted server, which is listed in a special position trusted server list, the script is processed. This list can be managed by the user. Also, a crypto library could be a so called WMLScript Crypto Library which can offer the possibility to sign data of a client with a digital signature before transmitting these to the origin server. Additionally this library provides the possibility to encrypt the user data, before sending it.

In order to provide eventual position information to the server, the terminal could be connected to position means. The position means could be a global positioning system (GPS) receiver, or by using cell identity information. The position means could provide greater flexibility to the user. For example, one who would like to use a GPS receiver will be independent of the wireless network, or may choose less expensive solutions to provide position information. Another example of position means is one who would like to use the wireless communication network, who could obtain position information by receiving cell identity information, e.g. by using time difference, and/or using time of arrival information.

The request is transmitted to linking means, "TRANSMIT REQUEST" 530, in order to establish a session between the linking means and the terminal. The linking means is arranged to forward the data packets between the terminal and the server. The linking means could be a gateway or a proxy server, which links the requested information to the correct access point. If the linking means do not respond to the request, "RECEIVED REQUEST?" 540, e.g. because the linking means is broken or the terminal does not have coverage to the wireless network, the terminal could receive an error message, which says that a connection to the linking means could not be established. Then, the user could choose to re-send the request once more, "TRANSMIT REQUEST" 530.

The item can comprise a script, which is arranged to provide provisions for accessing servers through the linking means. The script can activate or download linking applications from a gateway, i.e. an application which makes it possible to receive and/or transmit different types of data packets between the server and the terminal. For example, the different types of data packets can be a particular text format, software programs, different picture formats, etc. This allows a standard WAP browser to be used and provides flexibility for new features, e.g. a service provider having location information supported by different formats dependent on the request. This can be done by creating extensions to WML-, WML script- and XML-documents. Thus, the script can make it possible to access data packets, which might not be supported by the software in the terminal, by downloading the appropriate application, supporting the type of data format, directly to the terminal. In general, the data packets are data (content) stored or generated at an origin server. The content of the data packet is to be displayed or interpreted by the client. For example, one service provider supports a data packet comprising position information given by means of a satellite receiver, another server could support position information provided by cell identity information, and a third does not require any positioning information.

After the terminal has been connected to the linking means, the linking means can control that the access point is correct, "ACCESS POINT KNOWN?" 550. Far example, if the user has requested access to a server which no longer exists, is misspelled, or for some other reason is no longer known, the linking means could transmit an error message. This error message could then be displayed on the terminal, "DISPLAY ERROR MESSAGE" 560, providing the user with information about the error. Then the session could be terminated, either by the user or the linking means, "END" 570. If the access point is known, the linking means can send a pull message to the server, "SEND PULL TO THE SERVER" 580.

In a preferred embodiment, the gateway is able to encode content sent over the wireless network to the wireless terminal and decode data sent to it by the wireless terminal. This means that the system, i.e. the terminal, the linking means and the server, can be provided with encoding/decoding means, which can enable a fast transmission of data packets between the server and the terminal. Hence, this enables a transfer of binary data packets, which is much easier to transfer than an data packet which is not coded.

Also, the system can also encrypt/decrypt data packets between the terminal and the server, in order to provide a high level of security when transmitting wireless information. The data packets comprising the request, the formatted request, the response and the formatted request. This means that the gateway is provided with encoders and decoders (not shown). Also, the server comprises different algorithms to make the encryption/decryption. The encryption/decryption itself may be performed by well-known methods, e.g. RSA, Diffie-Hellman, etc. One way of handling data packets in a binary format is to use so called WAP Binary Content Format, such as WBXML (Wireless Binary extended Markup Language).

Finally, when the server has sent the requested information to the linking means, the requested location information will be linked (pushed) further from the linking means to the terminal, "DISPLAY CONTENT" 590. However, it is not necessary to display the received content, e.g. it could be directly stored in the memory. Finally, the session could be terminated, either by the user or the linking means, "END" 570.

Figure 6:
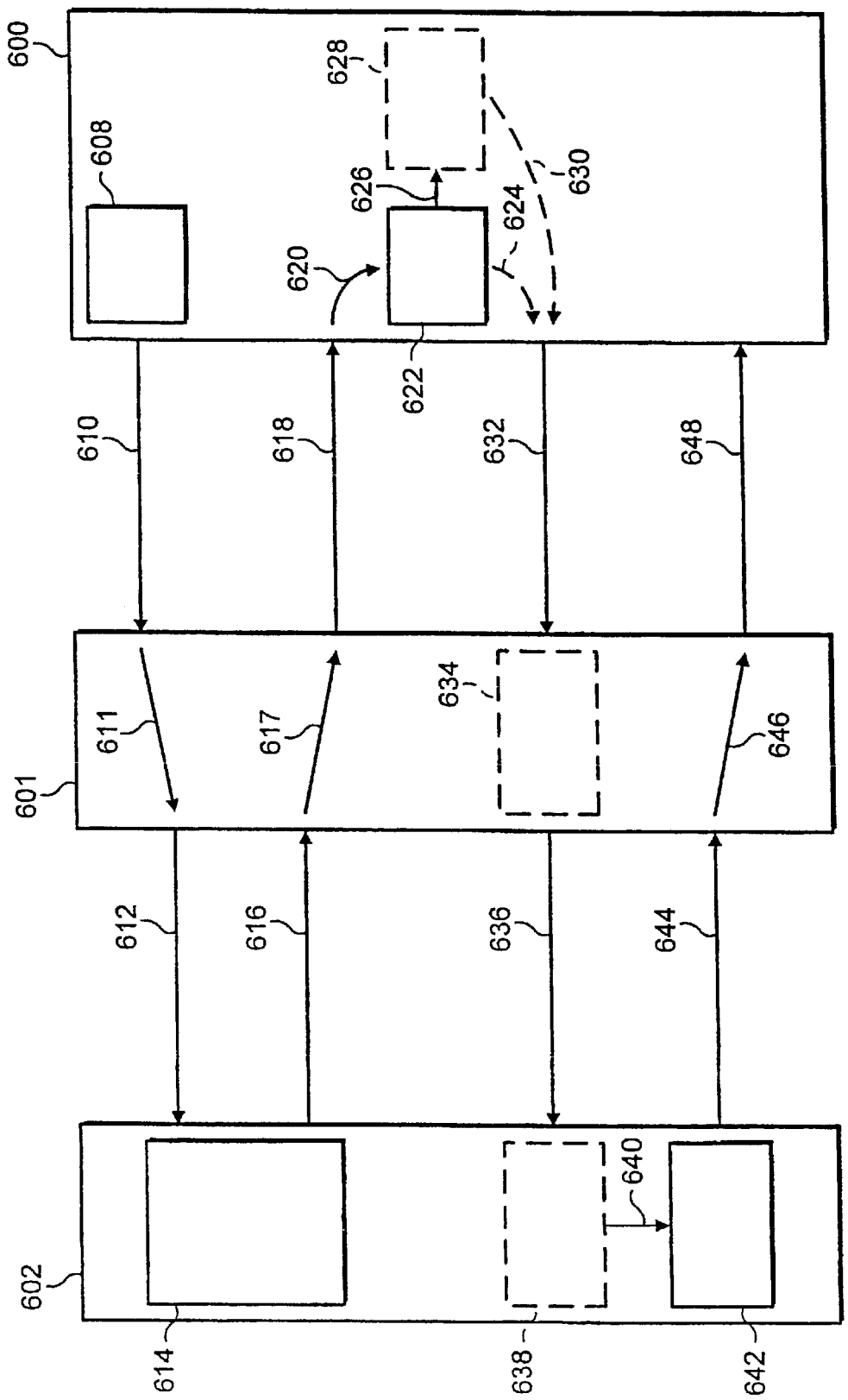
FIG. 6 shows a an example of the transmitted messages between a communication terminal, a network server and a gateway according to the Invention

A preferred embodiment will also be explained with reference to FIG. 6 in the following. Any optional features in FIG. 6 are marked with dashed lines/boxes. Box 600 represents a wireless communication terminal according to invention, which could be a phone as mentioned before. This phone might be installed in a car and can be connected to a car navigation system.

The browser application 608 within the phone 600 generates a request, which comprises an access point, which indicates the site of the server 602, which can provide the requested location information. This access point is preferably a URL (Uniform Resource locator) as it is known from various Internet applications.

The request for location information might be included in the URL itself or is attached to the request as a separate document. The request 610 is sent to the linking means 601, which is preferably a WAP gateway or a so called WAP proxy. The WAP proxy might receive the request from the phone 600 and forwards the request directly to the server 602 in step 611. Depending on the format of the request 610 from the phone the WAP proxy makes a protocol format conversion in step 611 before it is forwarded to the server 602. The request is then forwarded to the server 602 in step 612.

The request 612 is then processed in box 614 at the server site. The result could be that some ready location information can be returned to the phone, but in this example the result of the request processing is, that the position of the phone is necessary for the service.

Therefore the server 602 sends an indication of the requested location information in message 616 to the WAP proxy 601. The message 616 preferably contains a WML script which includes a script function to get the position of the phone 600. The message 616 is received by WAP Proxy

601 and if it is not already encoded, the WAP Proxy will encode the request in step 617. If it is encoded, the WAP proxy 601 just forwards the message.

The encoded message is then transmitted to the phone 600 in step 618. The message 618 for obtaining the position information of the terminal 600 can be checked in step 620 for security/privacy reasons (i.e. the user is asked on the display if the user agrees to return the user's position to the server). The user might allow transmitting the position or the user gave in an earlier step a general agreement, that the position information can be given to this trusted server.

The received script function is then processed in step 622. During this process the position of the terminal is gathered from any available positioning system, which can indicate the position of the phone as described above. The result of the script processing 622 is a string which contains the representation of the position of the terminal in a format which can be recognized by the server 602.

This string is then optionally forwarded in step 626 to the encoding means 628. An example format after the encoding in step 628 could be a binary representation of a XML-document. Then it is forwarded through the transmitter of the phone 600 to the WAP proxy 601 in step 630. The string can also be forwarded directly (624,630) to the WAP proxy 601. An example of the return format in step 624 can be an XML-document.

The position message 632 contains the URL of the position requesting server besides the position information. If the string, which contains the position information, was already encoded in the phone 600, the WAP proxy decodes the string in step 634 before it is forwarded in step 636 to the server but the decoding can optionally also take place in step 638 at the server site 602.

However, if the terminal is not able to provide position information, and the server still needs to have the actual position of the terminal, there are alternative ways of obtaining this position information. Hence, looking back on step 620 once more, and the terminal is no longer able to obtain position information, the terminal is able to forward t#is request of position information as a content type or a header to the linking means instead, i.e. step 632 is now a request instead of position information. The header fields allow the terminal to pass additional information about the position request, and about the terminal itself, to the linking means. These fields act as request modifiers, with semantics equivalent to the parameters on a programming language method (procedure); invocation, in this embodiment, it is preferred to use the content type. This content type or header might contain an indication that the terminal is not able to provide this position information, and it could be possible for the user of the terminal to set an option to search for alternative ways of obtaining the position information of the terminal. This searching could e.g. be done by means of the linking means, or even the server itself in some cases. If it is the linking means, which performs the search to find the location of the terminal, this information will be sent to the server, e.g. as an XML-document, i.e. the linking means is able to generate an. XML-document comprising the position information. The position information can be obtained from the cell Identity information, which is provided by the wireless telecommunication network, by using time difference information, and/or using time of arrival information. If it is the server, which performs the search to find the location of the terminal, this information can then be handled by server directly (Or indirectly) and generates the requested location information, based on the obtained position information. If the position information is handled directly, the server is able to search for the position information without sending a request to the terminal or the linking means. The position information can also be obtained in the same manner as in the case of the linking means, i.e. the cell identity information, which is provided by the wireless telecommunication network.

The server 602 can now process the complete request 610 in step 642 and returns the requested location information to the WAP proxy 601 in step 644. The response message 644 contains preferably a WML document, if the location information was not already encoded by the server it is encoded by the WAP proxy 601 in step 646 before it is forwarded to the phone 600 in step 648.

Each time when messages are transmitted between the WAP proxy 601 and the phone 600, a communication session needs to be established or already established sessions can be used for this purpose. Before the WAP proxy 601 transmits messages to the server 602 or the phone 600, it also checks if the message format is supported by the receiving terminal. If necessary the format is converted before the message is forwarded.

If the requested location information was originally, e.g. a request for traffic information from a car navigation system within a vehicle, the received information is not necessarily presented to the user. It could be possible that the browser application just forwards the information to the car navigation system which re-calculates the route to a destination based on the received traffic information without notifying the user about details of the traffic information. For example the user of a car navigation system also does not need to be notified that the car navigation system initiated the request for traffic information before the car reached for example a motorway Which is part of a calculated route to a destination.

The User Interlace.

With reference to FIGS. 5*a* and 5*b*, an example is shown of how the display in a user interface can act when accessing a server according to the present invention. The user interface may comprise the same elements as shown in FIG. 1, i.e. a keypad 2, a display 3, an on/off button 4, a speaker 5 and a microphone 6. Also, the terminal is provided with control means 18 as shown in FIG. 2, which controls the user interface. Starting from FIG. 5*a*, there is a layout 31 presented on a display in a phone, as shown in FIGS. 1 and 2, which indicates signal strength 35 from the wireless telecommunication network "DI Telekom" 40, the battery power 45 and a clock showing the time 50 in hours and minutes. Preferably, the display in the phone is an LCD (Liquid Crystal Display) display. The display, can be controlled by the control means. The layout 30 presents an example of the phone in idle mode, i.e. when the phone is activated and awaiting an action, e.g. an incoming or outgoing call. In the bottom of the display there are two items which are denoted as "Menu" 55 and "Names" 60. If the user selects "Names" 60 he/she can e.g. access a built in phone book. If the user selects "Menu" 55, he/she can select among several different menus. The actual selection of features in the bottom of the display, like "Menu" and "Names", can be selected by means of the soft keys disclosed with reference to FIG. 1.

One of the menus can be the next layout 65 called "Browser" 70. If the user chooses to use this menu, he/she can access different telecom related information services, e.g. Internet. One way of accessing this kind of information is to use the Wireless Application Protocol, WAP.

If the user chooses to select "Home" 71, this leads to the next layout 75, which graphically indicates, "Connecting to Service" 80. This shows an example of how the phone is trying to establish a connection to e.g. Internet, by sending an access request, through a gateway, to a server. If a connection is established to the gateway, some kind of welcome text for a home page might be displayed, "Welcome to DI Web." 90. If the user selects "Options" 90, the terminal connects to the server which provides different services, which is graphically indicated by the same layout 75, indicating "Connecting to Service" 80. When the terminal is connected to the service, a list of selections can be displayed as shown in the following layout 110. For example, the different choices could be "Location information" 115, "White pages" 120, "Pizza" 125, "CNN" 130, etc. In this example the user selects to use the Location information 115, and browses further to the service in the next layout 135.

The numbers which refer to FIG. 5b are 135–210. In the layout 135, a browser display is shown with the selected item, which is indicated as a link to a service which provides a Location information. The user can select to chose this item, by using the "Options" 140.

For example, the layout can be provided with different editable fields and selection list placeholders, which in this example are shown in square brackets ([ ]). One selection in layout 160 can be highlighted (not shown), indicating a default state of the selection. In these fields, the user can input a location, e.g. a city or a street etc., "From:[Bochum]" 170, to another location, "To:{Düsseldorf]" 175. Hence, if the user presses "Options" 180, the user will be able to enter an editor to input the name of a location, e.g. "Düsseldorf" 185, like shown in layout 187. Thereafter, the user may press Ok 190, whenever he/she is done, or clear the location fields by selecting "Clear" 191.

If the user wishes to continue with his/her location related request, and chooses another city, the user selects the option "To [Graz]:" 225, which becomes highlighted upon selection, and is shown in layout 230. In the next layout 235, a selection list of available cities is displayed. The user selects e.g. "Gorden" 240,, and selects the entry by selecting "Ok" 245. The next layout 250 highlights the selected city to receive location information about. Thereafter, the user may select "Options" 260, which in this example activates the calculation of the location and the result "Gorden: Stau on route 66 . . . " 265 is displayed with the selected information in the next layout 270. The arrow 280 indicates there is more information to read, which the user can see when he/she scroll down by e.g. the softkeys.

The invention is not limited to the above described embodiments but can be varied within the scope of the appended claims. For example, it can be further possible to make the receiving of location information more flexible, by providing an option to the user to specify from which server he/she would like to receive location information.

What is claimed is:

1. A method of providing information from a server to a wireless communication terminal in response to a request sent from the terminal, said terminal being provided with a browser application, and the server being provided with location means, the method comprising the steps of:

generating a request by use of the browser application, the request comprising at least one access point indicating the site of the server to be accessed, and a query identifying requested location information, said query being independent of the position of the terminal;

initiating a session to linking means, by sending the request from the communication terminal via a wireless telecommunication network to the linking means;

identifying the request at the linking means, by means of said access point;

formatting the request at the linking means, which is a gateway from the wireless communication network to the server, into a format supported by the server, and sending the formatted request to the servers;

processing the query at the server by means of said location means;

sending a response to said formatted request from the server to the linking means, said response comprising an indication of the requested location information;

establishing a session between said terminal and said linking means by formatting the response into a format supported by the terminal, and sending the formatted response from the linking means, via the wireless telecommunication network, to the terminal; and presenting said indication of the requested location information on said terminal, by means of said browser application; and wherein formulating the request, formatted request, response and formatted response is by using a markup language.

2. A method according to claim 1, wherein said terminal comprises security means, wherein said security means demands a confirmation of the request being sent to the server.

3. A method according to claim 1, wherein said request, formatted request, response and formatted response are encrypted by the terminal, the linking means and the server, in order to provide a level of security when transmitting wireless information.

4. A method according to claim 1, wherein said request, formatted request and formatted response are encoded by the terminal, the linking means and the server, in order to provide a transmission of the request, formatted request, response and formatted response.

5. A method according to claim 1, wherein said location means performs the processing, by means of a database comprising the location information.

6. A method according to claim 1, wherein formulating the request, formatted request, response and formatted response is by using WML, a WML-script, or a XML.

7. A method according to claim 1, wherein said linking means optionally searches for position information of said terminal, which is requested by the server, and sends the requested position information from the linking means to the server.

8. A method according to claim 7, wherein the linking means searches for the position information by sending a cellular position request to the wireless telecommunication network, to obtain the position information requested by the server.

9. A method according to claim 7, wherein said server optionally searches for the position information of said terminal, and sends the requested location information from the server based on the retrieved position information through the linking means to the terminal.

10. A method according to claim 9, wherein the server searches for the position information by sending a cellular position request to the wireless communication network, to obtain the requested location information based on said position information.

11. A method according to claim 1, wherein said terminal comprises position means, to determine position information of the terminal, and optionally sends the position information to the server, upon a request from the server, in order to give an indication of the position of the terminal.

12. A method according to claim 1, wherein said terminal comprises position means, which determines position information of the terminal, and optionally sends the position information to the server in the request sent to the server, in order to give an indication of the position of the terminal.

13. A method according to claim 9, wherein the position information is obtained by providing the position means with cell identity information, using observed time difference information, and/or using time of arrival information, provided by the wireless communication network.

14. A method according to claim 11, wherein the position means comprises a satellite positioning system, which provides positioning information independent of the wireless communication network.

15. A wireless communication terminal for accessing location information from a server, the terminal comprising:
- a receiver and a transmitter which receive and transmit data packets from and to at least one server comprising location means, through a wireless communication network connected to linking means, said linking means being a gateway from the wireless communication network to the server and formatting the data packets into a format supported by the server and forwarding the data packets between the terminal and the server;
- a memory comprising at least one item, which is provided with an access point which indicates the site of the at least one server to be accessed, wherein the at least one server is accessed by sending a request through the wireless communication network as a data packet comprising the access point to the linking means to access and receive content from the server;
- a browser application, which establishes a session to the linking means by reading the at least one item from the memory, to enable the transmitter to send the request as a data packet through the linking means to the server, and handle received content by means of said receiver; and
- a user interface connected to the browser application, the user interface including a display for displaying content received from the server and user input means to provide an input to the browser application; and wherein
- said input comprises query of local information, which is independent of position of the terminal, wherein the input is provided in the request, and arranged to receive and present content comprising an indication of said location information from said at least one server by means of said location means; wherein
- the browser application formulates the request, formatted request, response and formatted response by using a markup language.

16. A wireless communication terminal according to claim 15, wherein said terminal comprises security means, wherein said security means demands a conformation of the request being sent to the server.

17. A wireless communication terminal according to claim 15, wherein said browser application comprises encryption/decryption means which sends the request and receives the content in an encrypted format, in order to provide a level of security when transmitting wireless information.

18. A wireless communication terminal according to claim 15, wherein said browser application comprises encoding/decoding means which send the request and receive the content in a coded format, in order to provide a transmission of data packets.

19. A wireless communication terminal according to claim 15, wherein browsing application formulates the request, formatted request, response and formatted response by using WML, a WML-script, or a XML.

20. A wireless communication terminal according to claim 15, wherein the terminal comprises position means, which determines position information of the terminal, and optionally sends the position information to the server, upon a request from the server, in order to give an indication of the position of the terminal.

21. A wireless communication terminal according to claim 15, wherein said terminal comprises position means, which determines position information of the terminal, and optionally sends the position information to the server in the request sent to the server, in order to give an indication of the position of the terminal.

22. A wireless communication terminal according to claim 20, wherein said position means comprises the wireless communication network, which receives cell identity information, using observed time difference information, and/or using time of arrival information.

23. A wireless communication terminal according to claim 20, wherein said position means comprises a satellite positioning system, which receives the position information independent of the wireless communication network.

24. A wireless communication terminal according to claim 15 wherein said terminal is a cellular phone.

25. A system for accessing location information from a server, the system comprising:
- a wireless communication terminal including, a receiver and a transmitter which receive and transmit data packets from and to at least one server comprising location means, through a wireless communication network connected to linking means, said linking means being a gateway from the wireless communication network to the server and formatting the data packets into a format supported by the server and forwarding the data packets between the terminal and the server;
- server is accessed by sending a request through the wireless communication network as a data packet comprising the access point to the linking means to access and receive content from the server;
- a browser application, which establishes a session to the linking means by reading the at least one item from the memory, enabling the transmitter to send the request as a data packet through the linking means to the at least one server, and handle received content by means of said receiver,
- an input providing an input to the browser application, in order to access location information from the server;
- a wireless communication network, which establishes a connection between the wireless communication terminal and linking means;
- linking means which enables a session for said wireless communication terminal and forwards data packets between the terminal and a server; and
- the at least one server comprising location means, which receives and transmits data packets from and to the terminal, wherein
- said input, provided by the input means of the terminal, comprises query of location information, which is independent of the position of the terminal, wherein the input is provided in the request, and receives and presents content comprising an indication of said location information from said at least one server by means of the location means; and wherein the terminal, linking means and server formulate the request, formatted request, response and formatted response, by using a markup language.

26. A system according to claim 25, wherein said terminal comprises security means, wherein said security means demands a conformation of the request being send to the server.

27. A system according to claim 25, wherein said system comprises encryption/decryption means coupled to said terminal, linking means, and/or server which sends the request and receives the content in an encrypted format, in order to provide a level of security when transmitting wireless information.

28. A system according to claim 25, wherein said system comprises encoding/decoding means coupled to said terminal, linking means, and server which sends the request and receives the content in a coded format, in order to provide a transmission of data packets.

29. A system according to claim 25, wherein said terminal comprises position means, which determines position information of the terminal, and optionally sends the position information to the server upon a request from the server, in order to give an indication of the position of the terminal.

30. A system according to claim 25, wherein said terminal comprises position means, which determines position information of the terminal, and optionally sends the position information to the server in the request sent to the server, in order to give an indication of the position of the terminal.

31. A system according to claim 29, wherein the position means comprises the wireless communication network, which receives cell identify information, using observed time difference information, and/or using time of arrival information.

32. A system according to claim 29, wherein the position means comprises a global satellite system, which receives the position information independent of the wireless communication network.

33. A system according to claim 29, wherein communication between the at least one server, the linking means and the terminal are in accordance with the Wireless Application Protocol.

34. A system according to claim 29, wherein the terminal, linking means and server formulate the request, formatted request, response and/or formatted response, respectively, by using WML, a WML-script, or a XML.

* * * * *